United States Patent Office 3,422,687

Patented Jan. 21, 1969

3,422,687

GEAR REDUCER

James Edgar Krepps, Jr., Bloomington, Ind., assignor to Sarkes Tarzian, Inc., Bloomington, Ind., a corporation of Indiana Filed Oct. 21, 1966, Ser. No. 588,592
U.S. Cl. 74—10.8 14 Claims
Int. Cl. F16h *35/00, 57/00;* H03j *1/02*

ABSTRACT OF THE DISCLOSURE

A reduction gear assembly for rotating the shaft of a tuning condenser and the like between open and closed stop positions, comprising a manually rotatable shaft and a reduction gear means interconnecting the manual shaft and condenser shaft. The reduction gear means includes at least one pair of meshing gears having deflectable teeth permitting slippage between the meshing teeth when the condenser shaft is in one of said stop positions and torque is applied to the manual shaft. The slippage of the teeth produces an audible clicking sound indicating to the operator that the condenser is in one of its stop positions.

The present invention relates to a new and improved gear reducer and, more particularly, to a gear reduction assembly adapted to drive tuning condensers and the like used in electronic equipment.

Tuning condensers commonly used in radio and TV sets generally include pairs of intermeshing spaced apart rotor and stator plates. The rotor plates are generally mounted on a rotor shaft supported for rotation at the front and rear of the condenser frame. Generally, the rotor and stator plates are semicircular in plan configuration, and the rotor shaft is turnable through approximately 180° between a high capacity, closed or fully meshed stop position and a low capacity, open stop position wherein the diametrical cords of the stator and rotor plates are approximately parallel and the circular portions of the plates extend outwardly in opposite directions from one another. As the rotor shaft is turned between the stop positions, the capacity of the condenser is changed to tune in different stations and, accordingly, it is desirable that the shaft be rotated very slowly and at a uniform rate to avoid skipping over the various stations.

In many applications, dial cord assemblies are connected with the condenser rotor shaft, and these assemblies generally include a pointer movable along an elongated scale to provide an indication to the operator of the tuning position of the condenser. In many instances, the elongated scales used to represent the tuning frequency of the condenser are from six to eight inches long and, because the condenser shaft only rotates approximately 180° between opposite stop positions, a dial cord pulley having a rather large diameter is required to effect full pointer travel across the scale. In small radios and tuners, the limited cabinet space available prevents the use of such large dial cord pulleys with inaccuracies sometimes occurring in pointer position when other arrangements are devised. Another difficulty commonly encountered is when the condenser rotor reaches one of the stops and the operator continues to apply torque to the tuning knob, the dial cord slips on the pulley and thereafter gives erroneous information of the tuning position of the condenser on the scale.

It is therefore an object of the present invention to provide a new and improved gear reducer.

Another object of the invention is the provision of a new and improved gear reducer adapted for use with tuning condensers and the like.

Still another object of the invention is to provide a new and improved gear reducer for use with a tuning condenser which has a high gear reduction ratio between the manual tuning shaft and the condenser shaft to provide a relatively slow rate of rotational movement of the rotor plates and thereby avoid skipping over, or passing by too quickly, the stations that are tuned in.

Yet another object of the invention is the provision of a new and improved gear reducer of the character described which has little or no backlash between the reduction gearing so that stations may be accurately tuned in and will thereafter remain in tune.

Still another object of the invention is the provision of a new and improved gear reducer of the character described including means for operating a dial cord assembly to move a pointer along an elongated scale.

Another object of the invention is the provision of a new and improved gear reducer of the character described in the preceding paragraph wherein movement of the pointer is accurately controlled to always indicate the true tuning position of the condenser, even when the condenser reaches a stop position and the manual torque is thereafter applied to the tuning shaft.

Still another object of the invention is the provision of a new and improved gear reducer of the character described which does not require the use of large diameter dial cord hubs and yet provides accurate pointer movement along the scale.

A further object of the invention is the provision of a new and improved gear reducer of the character described which provides an audible clicking sound to indicate to the operator that the condenser is in a stop position.

A still further object of the invention is the provision of a new and improved gear reducer of the character described in which the gear teeth themselves produce the audible clicking noise indicating the condenser rotor has reached a stop position.

A further object of the invention is to provide a new and improved gear reducer of the character described which is simple in construction, easy to manufacture, reliable in operation, and low in cost.

For a better understanding of the present invention, reference should be had to the following detailed description taken in conjunction with the claims, in which:

FIG. 1 is a front elevational view of a new and improved gear reducer in accordance with the invention and illustrated with its associated tuning condenser and dial cord, pointer, and scale;

FIG. 2 is a side elevational view of the apparatus of FIG. 1 looking in the direction of the arrows 2—2;

FIG. 3 is a cross-sectional view of the tuning condenser illustrating the stop positions in phantom taken substantially along lines 3—3 of FIG. 2;

FIG. 4 is an enlarged fragmentary sectional view of one of the gear members of the gear reducer of the present invention taken substantially along line 5—5 of FIG. 1; and FIG. 5 is a side elevational view similar to FIG. 2 of an alternate embodiment of the invention.

Briefly, the foregoing and other objects and advantages of the present invention are accomplished by the provision of a new and improved reduction gear assembly for rotating the shaft of tuning condensers and the like between open and closed stop positions, including manually rotatable shaft means and reduction gear means for drivingly interconnecting the manual shaft means and the condenser shaft. The reduction gear means includes two interconnected pairs of intermeshing reduction gears constructed of resilient material, such as nylon or other polyamide material. The teeth means on one pair of intermeshing gears have a relatively high diametrical pitch relative to the teeth of the other pair of gears, and one ring of gear teeth is mounted at the edge of a thin deflectable annular hub so that when the condenser shaft is driven against a stop position and torque is still applied to the manual shaft means, the hub means carrying the smaller teeth means will deflect inwardly and permit the teeth thereon to slip or jump a tooth in relation to the adjacent meshing gear teeth. When this occurs, an audible clicking sound is produced which indicates to the operator that the condenser is in the stop position.

Referring now more particularly to the drawings, there is illustrated in FIGS. 1 through 4 one embodiment of a new and improved gear reducer in accordance with the invention and referred to generally by the reference numeral 10. The gear reducer 10 is adapted to drive the rotor shaft 12 of a tuning condenser 14 and a dial cord hub 16 which, in turn, drives a dial cord 18 around an idler pulley 20 to move a pointer 22 across an elongated, frequency indicating scale 24. The tuning condenser 14 is of conventional construction, including a U-shaped frame 26 having a slotted bottom 28 and a pair of upstanding rear and front end walls 30 and 32. The rotor shaft 12 extends parallel to and is centered above the elongated slot in the frame bottom 28 and is supported at its rear end by suitable bearing means mounted on the rear end wall 30. The forward portion of the rotor shaft 12 is supported in suitable bearing means mounted in the front wall 32 of the condenser frame, and the shaft projects forwardly through an aperture in the front wall for driving interconnection with the gear reducer 10. To this end, the projecting forward end of the rotor shaft includes a short splined section 12*a* and a reduced diameter spindle portion 12*b* extending forwardly thereof.

The main body portion of the rotor shaft 12 between the front and rear walls 30 and 32 is formed with a plurality of annular, inwardly extending grooves spaced along the length thereof, and within these grooves are seated a plurality of condenser rotor blades 34 arranged in groups or gangs A, B, C, and D (FIG. 2). The rotor blades 34 are semicircular in shape (FIG. 3) and each includes a small lug 34*a* projecting outwardly from the diametrical cord thereof for attachment with an insulating stop strip 36 extending longitudinally parallel with the shaft 12. The condenser 14 also includes a plurality of semicircular, parallel stator plates 38, likewise arranged in groups or gangs to intermesh between the gangs of rotor plates 34 when the condenser is closed. The stator plates 38 are supported in insulating relation with respect to the condenser frame 26 by means of a pair of longitudinal insulating side strips 40 and 42 extending upwardly from the frame bottom wall 28 on either side of the longitudinal slot therein (FIG. 3). Each gang of stator plates is supported from the insulating side strips by a pair of support lugs 44 and 46 which are soldered to radial, downwardly extending projections 38*a* thereon (FIG. 3), and the support lugs are formed with outwardly extending solder terminals 44*a* and 46*a* to facilitate electrical connection between the respective gangs of stator plates. The stator plates 38 are formed with semicircular apertures 38*b* at the center of the diametrical chord thereof to provide spacing between the plates and the condenser shaft and are also provided with stop recesses 38*c* at the outer right-hand end (FIG. 3) of the chord to accommodate the insulating strip 36 when the condenser is in a full open stop position, as indicated by the dotted lines. Each gang of rotor plates 34 is spaced to intermesh between a gang of stator plates 38 and the condenser shaft 12 is rotatable 180° between a closed stop position wherein the plates are fully intermeshed providing a maximum capacity and a fully open stop position, wherein the rotor and stator plates extend in opposite directions from their respective diametrical chords. In the open stop position, the condenser capacity is at minimum value and the insulating stop strip 36 is seated along the recesses 38*c* in the stator plates. Rotation of the shaft 12 in a counterclockwise direction from the open stop position gradually increases the condenser capacity as the rotor and stator plates begin to intermesh and a maximum capacity value is reached when the condenser rotor is in the fully intermeshed closed position with the insulating strip 36 resting along the upper diametrical chords of the stator plates adjacent the ends opposite the recesses 38*c*.

In accordance with the present invention, the gear reducer apparatus 10 includes a baseplate 50 secured to the front wall 32 of the condenser frame, and the baseplate provides support for an axle or spindle 52 projecting forwardly outward therefrom and parallel to the condenser rotor shaft 12. The gear reducer apparatus comprises a first pair of intermeshing reduction gears which are formed of resilient material, such as nylon or the like, and the first pair of gears includes a driving or pinion gear 54 which is integrally formed at the inner end of a manually turnable shaft member 56 journaled on the reduced diameter outer spindle portion 12*b* of the condenser shaft. The manual shaft member 56 is freely rotatable on the spindle portion 12*b* and is secured against outward movement thereon by means of a C-type spring washer 58 seated in an annular groove adjacent the outer end of the spindle portion. The shaft member 56 is manually turnable by mean of a removable knob 59 which is slipped onto a splined outer end portion of the shaft in a conventional manner.

The teeth of the pinion gear 54 are drivingly engaged with the teeth of a larger diameter, driven gear 60 integrally formed on a rotating member 61 which is journaled for free rotation on the axle 52. The teeth of the driven gear 60 are integrally formed adjacent the outer edge of an outer cylindrical collar 62 having a thin, deflectable annular wall (FIG. 4) and the inner end of the outer collar is integrally joined to a circular, radially extending web or disk 64. The rotating member 61 includes a forwardly extending central hub or boss 66 integral with the disk 64 and formed with an aperture therein to support the rotating member on the axle 52. The dial cord hub is integrally joined at its inner end with the circular web 64 and is arranged in concentric relation with the axle 52 inwardly of the outer gear collar 62. The dial cord hub is provided with several slits or recesses 16*a* spaced around the circumference thereof and extending parallel to the axis of the central hub 66 in order to accommodate the dial cord 18 and prevent slippage thereof on the hub, and the dial cord hub is considerably thicker than the thin walled outer collar 62 which carries the teeth of the gear 60.

In practice, the gear 60 is constructed to have a diameter approximately four times that of the pinion gear 54 in order to effect a gear reduction between the manual shaft 56 and the rotating member 61 so that one revolution of the manual shaft will produce only about 90° of rotation (one-fourth revolution) of the rotating member on the axle 52. The meshing teeth of the pinion gear 54 and driven gear 60 are constructed to have a relatively high diametrical pitch, for example, a pitch in the range of 84 to 96, and, accordingly, these teeth are relatively small in size with respect to the teeth in the second pair of gears, as will be explained in detail hereinafter. The spacing between the manual shaft member 56 and the spindle 52 is dimensioned so that the thin walled outer collar 62 will be deflected inwardly slightly by the force of the teeth on the pinion 54 (as shown in exaggerated form in FIG. 4) and because of this and because of the relatively high diametrical pitch of the first pair of intermeshing gears 54 and 60, there is little or no backlash between the gears, even though the gears are constructed of nylon rather than metal and are not machined after they are formed, preferably in a casting process.

The second pair of intermeshing reduction gears of the gear reducer 10 includes a driving pinion gear 67 integrally formed on the rotating member 61 and projecting inwardly toward the baseplate 50 from the radial disk 64.

The inner end face of the pinion 67 abuts against the outer annular face of an enlarged boss 52a of the axle 52 and limits the inward travel of the rotating member 61 relative to the condenser frame. The teeth of the pinion 67 are drivingly meshed with the teeth of a driven gear 68 which is secured onto the splined portion 12a of the condenser rotor shaft 12. In practice, the gear 68 is approximately four times greater in diameter than the pinion 67 so that a second gear reduction is accomplished between these gears, thereby providing an overall gear reduction between the manually turned shaft member 56 and the condenser shaft 12 of about sixteen to one. Accordingly, for each revolution of the manual shaft member 56, the condenser rotor shaft turns one-sixteenth revolution, or approximately 22½ degrees, and approximately eight complete revolutions of the manual shaft member will move the condenser rotor between the fully open and the fully closed stop positions.

The teeth of the second pair of reduction gears 67 and 68 are constructed to have a diametrical pitch substantially lower (for example, a pitch of 48) than the diametrical pitch of the first pair of reduction gears 54 and 60, and, accordingly, the teeth of the second pair of reduction gears are substantially larger and stronger. When the condenser rotor shaft 12 is turned until the rotor plates 34 are in a fully open or fully closed stop position, the insulating stop strip 36 prevents further rotation of the condenser rotor shaft, and when a large torque is applied to the manual shaft member 56 tending to move the shaft past the stop position, slippage will occur between the meshing teeth in the gear reducer. Because the teeth of the second pair of reduction gears are larger and stronger (lower diametrical pitch) than the teeth of the first pair of reduction gears, and because the teeth of the gear 60 are mounted around the outer edge of the thin walled, deflectable, annular collar 62, the collar is deflected inwardly, as shown in exaggerated form in FIG. 4, permitting the teeth 60 to jump or skip relative to the teeth 54 on the manually turned shaft member 56. In other words, the rotating member 61 is locked against rotation through the gears 67 and 68 drivingly connected with the rotor shaft 12 and, accordingly, the main body portion of the member 61 will not rotate. However, if the torque applied to the manual shaft member 56 is strong enough, the teeth of the pinion gear 54 will exert an inward force on the thin walled collar 62 which carries the teeth 60, and when the collar is deflected far enough inwardly (FIG. 4) the teeth on the pinion 54 will ride over and slip into mesh with the next adjacent teeth 60 on the collar 62. When this occurs, an audible clicking sound is produced and this alerts the person tuning the condenser 14 that the condenser is against one of the stops.

The reason for the slippage or skipping of mesh between the teeth occurring in the first pair of reduction gears, rather than in the second pair, is partly because of the difference in the diametrical pitch and because of the fact that the teeth 60 are mounted on the free edge of the thin, annular collar 62 which can be deflected inwardly. Since the gear teeth are constructed of resilient material, such as nylon, such slippage or skipping of mesh does not permanently deform the teeth or damage them and, in addition, produces the useful audible clicking noise which indicates to the operator that the condenser stop position has been reached.

Because the dial cord hub 16 is integrally formed with the rotating member 16, it does not rotate when the condenser rotor is at a stop position and the slippage or tooth skipping action occurs and, accordingly, the pointer 22 is always in correct tracking position along the scale 24 and shows the true position of the condenser rotor. Also, because the dial cord hub 16 is integral with the driven gear 60 which rotates about one-fourth as fast as the manual shaft member 56, the outer diameter of the hub can be reduced in diameter and still provide a relatively large amount of movement of the pointer along the scale between the condenser stop positions.

The gear reducer 10 provides for extremely accurate tuning of small-sized condensers, yet permits a relatively longer expanded dial scale to be used therewith. In addition, there is little, if any, backlash associated with the gear reducer, and an audible noise is produced when the condenser rotor reaches either of the stop positions. The gear reducer is relatively small in size, simple in construction, and low in cost, and is especially well adapted for use in miniature and portable radio, TV, and communication equipment.

Referring now to FIG. 5 therein is illustrated another embodiment of the present invention which is similar in many aspects to the previous embodiment and which is referred to generally by the numeral 110. Accordingly, reference numbers having the prefix "1" will be used to identify components in the gear reducer 110 similar in construction or function to those of the reducer 10 previously described.

The gear reducer 110 includes a manual shaft member 156 having a driving pinion gear 154, and the shaft member is mounted remotely from and parallel to the main condenser rotor shaft 112. The manual shaft member 156 is supported for rotation on one or more brackets 170 having bearing apertures therein rather than from the condenser rotor shaft, and the brackets are in turn supported from adjacent chassis or cabinet members (not shown). In order to permit a single aplication of torque or twist by an operator on the manual shaft member 156 to turn the condenser rotor shaft 112 a greater amount without additional torque applications, a flywheel 172 is mounted on the shaft member, and the flywheel provides momentum so that a single spin of the knob 159 can rotate the condenser through its entire tuning range between fully closed and fully open stop positions.

The pinion gear 154 meshingly engages a gear 160 on the rotating member 161 which is identical to the member 61 of the previous embodiment to effect a first gear reduction. The member 161 is mounted on a spindle or axle 152 extending forwardly from a base plate 150 secured to the front of the condenser frame, and the member 161 includes a pinion 167 which drivingly engages a gear 168 on the condenser rotor shaft 112 to effect the second gear reduction.

The gear teeth sizing and material are the same as that for the previous embodiment and operation of the gear reducer 110 has the similar desirable operating characteristics. In addition, the flywheel 172 provides mommentum so that rapid tuning can be effected across a broad range by a single twist of knob 159 on the manual shaft member 156 or by means of a belt drive from another remote shaft to the flywheel 172. The rotary member 161 includes a dial cord hub 116 similar to the hub 16 for effecting the movement of a pointer along an elongated scale.

What is claimed as new and desired to be secured by Letters Patent of the United States is:

1. In a reduction gear assembly for rotating the shaft of a tuning condenser between open and closed stop positions comprising, first driven gear means mounted on said condenser shaft for rotating the same, first pinion gear means in driving engagement with said first driven gear means and mounted for rotation on shaft means remote from said condenser shaft, second driven gear means mounted on said remote shaft means and connected with said first pinion gear means to rotate the same, and second pinion gear means in driving engagement with said second driven gear means, said first pinion and driving gear means having a diametrical pitch substantially greater than the diametrical pitch of said second pinion and driven gear means, said second pinion and driven gear means including meshing teeth of deflectable material movable to slip with respect to one another when torque is applied to said second gear pinion means and said tuning condenser is at one of said stop positions.

2. The assembly of claim 1 wherein one of said second pinion and driven gear means includes teeth means mounted on a thin walled, inwardly deflectable annular collar means.

3. The assembly of claim 1 wherein said second pinion and driven gear means are constructed of resilient material for permitting slippage between the teeth thereof and producing an audible clicking sound as slippage occurs.

4. The assembly of claim 1 wherein said remote shaft means is supported by said tuning condenser and extends outwardly thereof parallel with said condenser shaft.

5. The assembly of claim 1 wherein said first pinion gear means and said second driven gear means are integrally interconnected for rotation on said remote shaft means, said second driven gear means including a circular wall section extending radially outward of said first pinion gear means and an annular, thin walled, inwardly deflectable, cylindrical tooth-carrying collar around the outer edge of said circular wall section coaxial with said shaft means.

6. The assembly of claim 5 wherein the teeth of said second driven gear means are positioned in a ring extending outwardly of said collar adjacent the outer end thereof remote from said circular wall section.

7. The assembly of claim 5 including cylindrical hub means extending outwardly of said circular wall section and coaxial with and inwardly of said tooth-carrying collar for accommodating a dial cord adapted to indicate the position of said condenser shaft.

8. In a reduction gear assembly for rotating the shaft of a tuning condenser between open and closed stop positions, the improvement comprising manually rotatable shaft means, and reduction gear means interconnecting said manual shaft means and said condenser shaft, said reduction gear means including at least one pair of meshing gears constructed of resilient material for permitting slippage between the teeth thereof, producing an audible sound when said condenser shaft is in one of said stop positions and torque is applied to said manual shaft means, one of the gears in said one pair of meshing gears comprising teeth mounted on a thin walled, annular, inwardly deflectable collar means.

9. The assembly of claim 8 wherein said reduction gear means includes first and second pairs of intermeshing gears having substantially different diametrical pitches whereby said slippage occurs only between the teeth of one of said pairs.

10. The assembly of claim 9 wherein said one pair of gears includes a pinion and driven gear having a substantially different number of teeth to effect a partial gear reduction and including dial cord hub means carried with said one driven gear.

11. The assembly of claim 8 wherein the driving one of said pairs of intermeshing gears is mounted or rotation on said condenser shaft.

12. The assembly of claim 11 wherein the other of said first pair of intermeshing gears is mounted on shaft means supported on said condenser remote from the shaft thereof.

13. The assembly of claim 8 wherein the driving one of one of said pairs of intermeshing gears is mounted on said manual shaft means.

14. The assembly of claim 13 wherein the driving one of said one pair of intermeshing gears is mounted on shaft means supported on said condenser remote from said condenser shaft.

References Cited

UNITED STATES PATENTS 2,177,760 10/1939 Wheat -------------- 74—10.8

MILTON KAUFMAN, *Primary Examiner.*

U.S. Cl. X.R.

74—411; 116—124.1